(12) United States Patent
Peng

(10) Patent No.: US 12,290,048 B1
(45) Date of Patent: May 6, 2025

(54) PET ELIZABETHAN COLLAR

(71) Applicant: Qingling Peng, Ji'an (CN)

(72) Inventor: Qingling Peng, Ji'an (CN)

( * ) Notice: Subject to any disclaimer, the term of this patent is extended or adjusted under 35 U.S.C. 154(b) by 0 days.

(21) Appl. No.: 19/008,797

(22) Filed: Jan. 3, 2025

(30) Foreign Application Priority Data

Dec. 14, 2024 (CN) .......................... 202423088303.1

(51) Int. Cl.
*A01K 13/00* (2006.01)
*A01K 27/00* (2006.01)

(52) U.S. Cl.
CPC .......... *A01K 13/006* (2013.01); *A01K 27/001* (2013.01)

(58) Field of Classification Search
CPC .. A01K 27/001; A01K 13/006; A01K 15/006; A01K 15/04; A61D 9/00
See application file for complete search history.

(56) References Cited

U.S. PATENT DOCUMENTS

| | | | | |
|---|---|---|---|---|
| 2003/0150401 A1* | 8/2003 | Schmid | ................ | A01K 13/006 119/815 |
| 2007/0181080 A1* | 8/2007 | Gibson | ................ | A01K 27/001 119/815 |
| 2009/0056642 A1* | 3/2009 | Markfield | ............ | A01K 13/006 128/888 |
| 2011/0030623 A1* | 2/2011 | Colangelo | ............ | A01K 13/006 119/855 |
| 2015/0053147 A1* | 2/2015 | Lippincott | ........... | A01K 13/006 119/821 |
| 2015/0164045 A1* | 6/2015 | Colangelo | ............ | A01K 13/006 119/855 |
| 2017/0099808 A1* | 4/2017 | Garfinkel | ............. | A01K 13/006 |
| 2018/0184619 A1* | 7/2018 | Sparks | ................... | A01K 15/04 |
| 2022/0015332 A1* | 1/2022 | Stewart | ................ | A01K 13/006 |
| 2022/0287814 A1* | 9/2022 | Sparks | ..................... | A61D 9/00 |
| 2024/0324556 A1* | 10/2024 | Xu | ........................ | A01K 13/006 |

* cited by examiner

*Primary Examiner* — Trinh T Nguyen
(74) *Attorney, Agent, or Firm* — JEEN IP LAW, LLC

(57) ABSTRACT

A pet Elizabethan collar is provided, which includes a baffle, a first flexible connector, an airbag ring, a detachable connector, and an adjustment piece. The baffle is composed of at least two fan-shaped blocking pieces that are assembled through the first flexible connector. The airbag ring is provided on a small arch edge of the baffle, and placed on a pet's neck after being enclosed by the detachable connector, the airbag ring can be adjusted to fit the pet's neck by adjusting an inflation amount, thereby improving the comfort of wearing while ensuring stability. The airbag ring is provided with a crease corresponding to the first flexible connector, which can achieve the folding of the entire product and render it more convenient for product packaging and storage; the airbag ring is evenly divided into a plurality of small airbag cavities by crease and meridian.

10 Claims, 2 Drawing Sheets

PET ELIZABETHAN COLLAR

CROSS-REFERENCE TO RELATED APPLICATIONS

This application claims priority to Chinese Patent Application No. 202423088303.1, filed on Dec. 14, 2024, which is hereby incorporated by reference in its entirety.

TECHNICAL FIELD

The present disclosure relates to the field of pet supply technologies, and in particular, to a pet Elizabethan collar.

BACKGROUND

Elizabethan collar is a pet protective collar that prevents scratching and biting, as well as neck protection, to prevent pets from biting and injuring themselves, or to prevent pets from scratching wounds or ingesting portions after surgery. The existing Elizabethan collars are generally formed by bonding fan-shaped surfaces to form a trumpet shaped structure, with edges made of chloroprene rubber on both the outer and inner circular edges of the collars. Although they can provide protection, they are relatively bulky and can easily compress the pet's neck, rendering them inconvenient to use. Furthermore, the trumpet shaped structure is generally a hard structure that cannot be folded, and the packaging or storage volume is too large, rendering it inconvenient for transportation and user storage. Therefore, a further improvement needs to be made to the structure of the Elizabethan collar.

SUMMARY

In view of this, the present disclosure provides a pet Elizabethan collar, which addresses the problems of the prior art by designing an airbag structure and a folding structure to solve the existing technical problems.

The purpose of the present disclosure is achieved through the following technical solutions.

A pet Elizabethan collar, including:
- a baffle composed of at least two fan-shaped blocking pieces assembled together, a first end is extended to a second end so as to form an inner small arch edge and an outer large arch edge, where the first end and the second end are two sides of the baffle after being composed of the fan-shaped blocking pieces; a length of the outer large arch edge is larger than a length of the inner small arch edge;
- a first flexible connector provided between the fan-shaped blocking pieces, configured to connect the blocking pieces and render them to be foldable between them;
- an airbag ring provided on the small arch edge of the baffle, where the airbag ring is provided with a crease corresponding to the first flexible connector that extends through the airbag ring; the airbag ring is rolled up and closed along the inner small arch edge to form a barrel with an axial cross-section of trapezoid that is capable of being placed on a pet's neck;
- a detachable connector including a first connection part and a second connection part, where the first connection part and the second connection part are respectively fixed on two opposite sides of the first end and the second end, where the first connection part and the second connection part are extended to two ends of the airbag ring that cover the airbag ring.

In some embodiments of the present disclosure, an outer collar of the airbag ring has a same shape as the inner small arch edge of the baffle and is fixedly provided on the inner small arch edge, and a length of an inner collar of the airbag ring is smaller than a length of the outer collar and forms a circle that is capable of being placed around the pet's neck after being closed.

In some embodiments of the present disclosure, an outer edge of the inner collar is further fixedly provided with an adjustment piece.

In some embodiments of the present disclosure, the adjustment piece includes a soft rope-passing part fixed on an outer edge of the inner collar, and an adjustable rope is provided in the soft rope-passing part; two ends of the adjustable rope are provided with movable buckles configured to adjust a length of a tightening part of the adjustable rope, and a closure tightness of the inner collar is adjusted by tightening or loosening the adjustable rope.

In some embodiments of the present disclosure, the fan-shaped blocking pieces are made of hard transparent PVC material.

In some embodiments of the present disclosure, the detachable connector is a Velcro connector, the first connection part and the second connection part are two surfaces of the Velcro.

In some embodiments of the present disclosure, the airbag ring is provided on the inner small arch edge of the baffle through a second flexible connector, and the baffle is capable of being folded up along the second flexible connector.

In some embodiments of the present disclosure, the second flexible connector is a zipper, and the baffle is capable of being removed from the airbag ring.

In some embodiments of the present disclosure, a transverse meridian is provided on the airbag ring, the meridian and the crease divide the airbag ring into a plurality of small airbag cavities that are sequentially communicated; the airbag ring is made of nylon or PVC material.

In some embodiments of the present disclosure, the airbag ring is further provided with an air nozzle for inflation and deflation; the airbag ring is filled with air, aromatherapy gas or a mixture of medicinal liquids through the air nozzle.

The beneficial effects of the present disclosure are:
the present disclosure provides an airbag ring on an upper side of a baffle of a pet Elizabethan collar. After being enclosed by a detachable connector, the pet Elizabethan collar can be placed on a pet's neck, the airbag ring can be adjusted to fit the pet's neck by adjusting an inflation amount, thereby improving the comfort of wearing while ensuring stability. It is compact and convenient, and the baffle is configured to be composed of at least two fan-shaped blocking pieces that are assembled through a first flexible connector. The airbag ring is further provided with a crease corresponding to the first flexible connector, which can achieve the folding of the entire product and render it more convenient for product packaging and storage; the airbag ring is evenly divided into a plurality of small airbag cavities by creases and meridian, which can be bulged more evenly. When placed on the pet's neck, it is more comfortable. Aromatherapy gas or a mixture of medicinal liquids can also be injected into the airbag ring for deodorization treatment.

Numeral reference: 10 baffle, 11 fan-shaped blocking piece, 12 first end, 13 second end, 14 inner small arch edge, 15 outer large arch edge, 20 first flexible connector, 30 airbag ring, 31 crease, 32 outer collar, 33 inner collar, 34 meridian, 35 small airbag cavity, 36 air nozzle, 40 detachable connector, 41 first connection part, 42 second connection part, 50 adjustment piece, 51 soft rope-passing part, 52 adjustable rope, 53 buckle, 60 second flexible connector.

DESCRIPTION OF EMBODIMENTS

Below, a detailed description of the disclosed embodiments will be provided in combination with the accompanying drawings.

The following specific examples are used to illustrate the implementation of the present disclosure, and those skilled in the art can easily understand other advantages and effects of the present disclosure from the content disclosed in this specification. Obviously, the described embodiments are only a part of the disclosed embodiments, not all of them. The present disclosure can also be implemented or applied through different specific implementation modes, and various details in this specification can be modified or changed based on different perspectives and applications without departing from the spirit of the present disclosure. It should be noted that, without conflict, the following embodiments and their features can be combined with each other. Based on the embodiments disclosed in the present disclosure, all other embodiments obtained by those skilled in the art without creative work are within the protection scope of the present disclosure.

In order to improve a comfort of use and facilitate packaging and storage, a specific description of the present disclosure is as follows.

Figure 1:
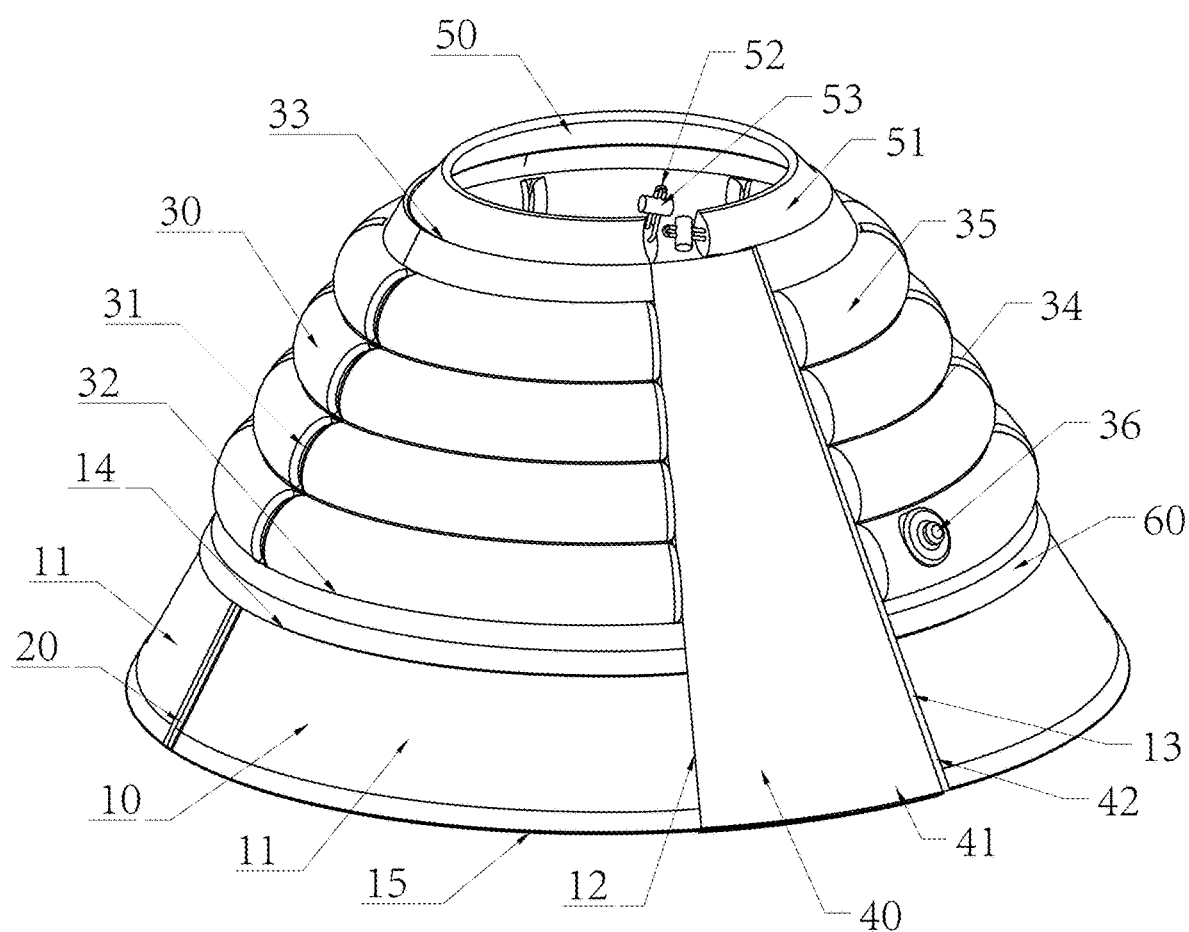
FIG. 1 is a schematic structural diagram of a pet Elizabethan collar in the present disclosure.
Figure 2:
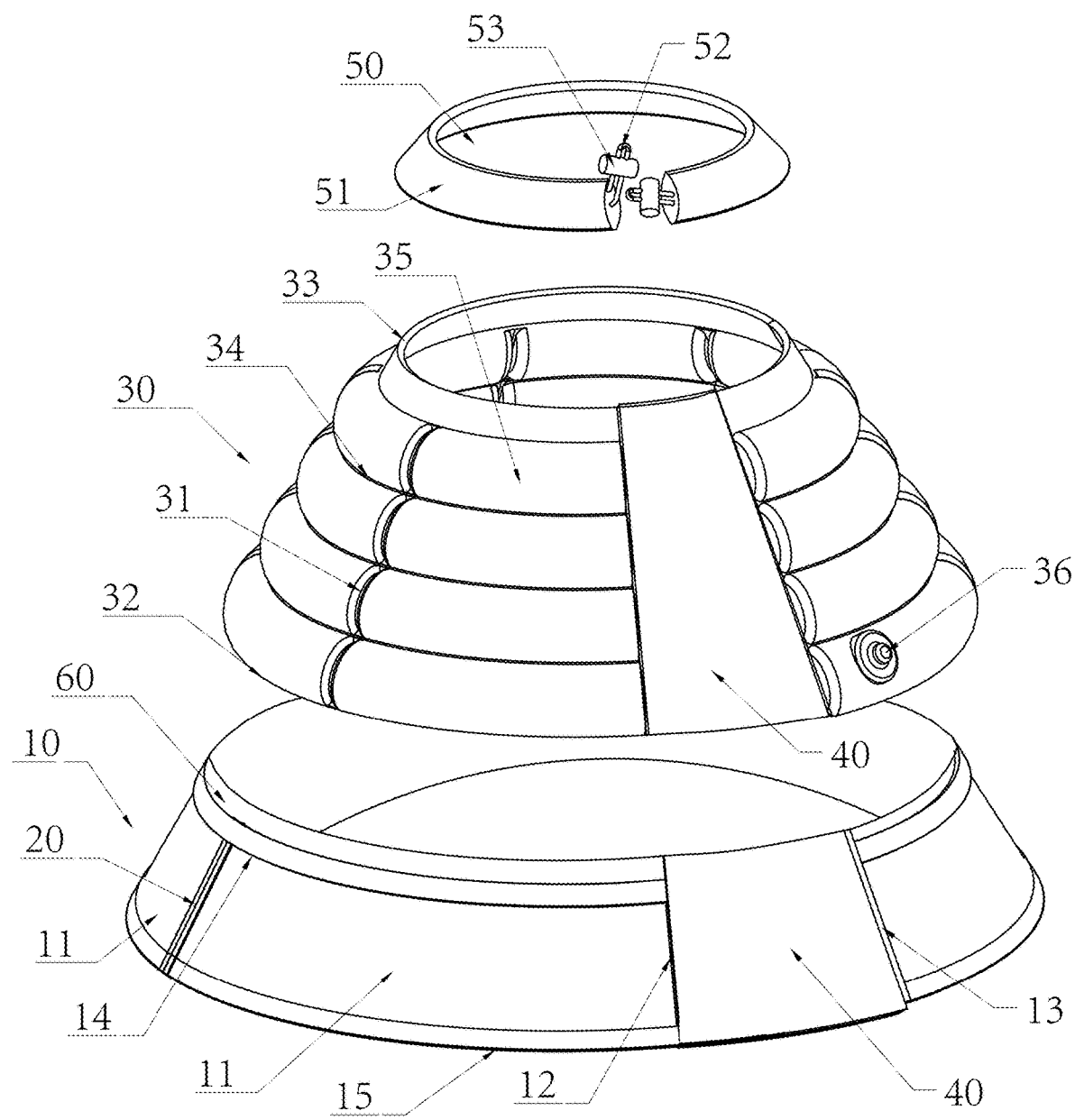
FIG. 2 is a schematic diagram of a disassembly of the pet Elizabethan collar in the present disclosure.

As shown in FIGS. 1 and 2, an embodiment of the present disclosure provides a pet Elizabethan collar, which includes a baffle 10, a first flexible connector 20, an airbag ring 30, and a detachable connector 40.

The baffle 10 is composed of at least two fan-shaped blocking pieces 11 that are assembled together. After the fan-shaped blocking pieces 11 are assembled, a first end 12 is extended to a second end 13 on two sides of the baffle 10 to form an inner small arch edge 14 and an outer large arch edge 15. A length of the outer large arch edge 15 is larger than that of the inner small arch edge 14. Generally, the fan-shaped blocking pieces 11 are made of hard transparent PVC material, which can provide good support for the overall pet Elizabethan collar. During a curling process, it can maintain its shape well and form a barrel structure having a cross section of trapezoidal, thereby covering a pet's head and providing protection to prevent the pet from scratching wounds or taking medicine. At the same time, the transparent material setting cannot block the pet's sight view and facilitate a movement of the pet.

The first flexible connector 20 is configured to connect the blocking pieces 11. The flexible material setting allows the fan-shaped blocking pieces 11 to be folded along the first flexible connector 20, so that the baffle 10 can be folded and stored, thereby reducing a volume and facilitating packaging and user storage.

The airbag ring 30 is provided on the inner small arch edge 14 of the baffle 10. The airbag ring 30 is provided with a crease 31 corresponding to the first flexible connector 20 that extends through the airbag ring 30. After being rolled up and closed along the inner small arch edge 14, the airbag ring 30 forms a barrel shape having an axial cross-section of trapezoidal that can be placed on the pet's neck. The shape starts to shrink inward from the inner small arch edge 14, usually in a fan shape. The airbag ring 30 can be adjusted to fit the pet's neck by adjusting an inflation amount, thereby improving the comfort of wearing while being stable. It is compact and convenient.

When the airbag ring 30 is folded along the first flexible connector 20 on the baffle 10, it is also folded along the extended crease 31. When storage is needed, the airbag ring 30 can be folded together with the baffle 10 by releasing the gas inside. The storage volume is small, rendering it convenient for packaging and user storage.

The detachable connector 40 includes a first connection part 41 and a second connection part 42. The first connection part 41 and the second connection part 42 are respectively fixed on two opposite sides of the first end 12 and the second end 13, so that they are relatively arranged. When the pet Elizabethan collar is rolled up for use, the first connection part 41 can be connected to the second connection part 42, and the first connection part 41 and the second connection part 42 are extended to the airbag ring 30, thereby covering ends of the airbag ring 30 and also connecting two ends of the airbag ring 30 after the airbag ring 30 is rolled up.

The present disclosure is to provide the airbag ring 30 on an upper side of the pet Elizabethan collar baffle 10, which is enclosed by the detachable connector 40 and then placed on the pet's neck. The airbag ring 30 can be adjusted to fit the pet's neck by adjusting the inflation amount, improving the comfort of wearing and being stable, it is compact and convenient; and the baffle 10 is composed by at least two fan-shaped blocking pieces 11 that are assembled through the first flexible connector 20, and the airbag ring 30 is further provided with the crease 31 corresponding to the first flexible connector 20, which can achieve the folding of the entire product and facilitate the packaging and storage of the product.

In some embodiments, as shown in FIGS. 1 and 2, an outer collar 32 of the airbag ring 30 has a same shape as the inner small arch edge 14 of the baffle 10 and is fixedly provided on the inner small arch edge 14. A length of an inner collar 33 of the airbag ring 30 is smaller than that of the outer collar 32 and forms a circle that can be placed on the pet's neck after being closed. The airbag ring 30 is also shrined toward a direction of the baffle 10, and it has a fan shape after being fully deployed. After being rolled up, the detachable connector 40 of the airbag ring 30 can be opened to connect the two ends of the airbag ring 30. After being closed, the airbag ring 30 can be placed on the pet's neck by adjusting the inflation amount, which can massage the pet's neck, relieve the emotions of injured pets, and improve the wearing stability while enhancing the wearing experience and improving a comfort level.

In an implementation mode, as shown in FIGS. 1 and 2, in order to further stabilize the pet Elizabethan collar, an adjustment piece 50 is fixedly provided on an outer edge of the inner collar 33, which can be used in combination with the detachable connector 40 to better secure it to the pet's neck of different sizes.

In an implementation mode, as shown in FIGS. 1 and 2, in order to facilitate adjustment and use, the adjustment piece 50 includes a soft rope-passing part 51 fixed the outer edge of the inner collar 33. The soft rope-passing part 51 is provided with an adjustable rope 52 that can be moved, and adjustable buckles 53 are provided at two ends of the adjustable rope 52 for adjusting a length of a tightening part of the adjustable rope 52. A closure tightness of the inner collar 33 can be adjusted by tightening or loosening the adjustable rope 52, which can be used for pet's neck with different sizes.

In an implementation mode, in order to maintain an overall shape of the pet Elizabethan collar and facilitate the movement of the pet, the fan-shaped blocking pieces 11 are made of hard transparent PVC material. The hard material can provide good support for the overall pet Elizabethan collar, and during a curling process, it can maintain its shape well, thereby forming a barrel structure with a cross section of trapezoidal to cover the pet's head and provide protection, preventing the pet from scratching wounds or eating medicine. At the same time, the transparent material setting cannot block the pet's sight view and facilitate the movement of the pet.

In an implementation mode, in order to facilitate a user to use the Elizabethan collar, the detachable connector 40 is a Velcro connector. The first connection part 41 and the second connection part 42 are two surfaces of the Velcro, respectively. When the pet Elizabethan collar is rolled up for use, a Velcro child surface can be connected to a Velcro mother surface. When the Elizabethan collar needs to be removed, only the two surfaces of the Velcro need to be torn open to open the Elizabethan collar. It is very convenient to use, and the Velcro structure is simple, lightweight, and low-cost, which is very suitable for use.

In an implementation mode, as shown in FIGS. 1 and 2, in order to further reduce the storage volume, the airbag ring 30 is provided on the inner small arch edge 14 of the baffle 10 through a second flexible connector 60. The baffle 10 can be folded up along the second flexible connector 60, so that the baffle 10 can also be folded up. Thus, it has a smaller storage volume and facilitates the packaging and user storage.

In an implementation mode, in order to have more usage scenarios, the second flexible connector 60 is a zipper, and the baffle 10 can be removed from the airbag ring 30. When the pet has a small body size or does not need to use the baffle 10, the baffle 10 can be removed to facilitate the use of pets with different sizes, with more usage scenarios and more convenient for users.

In an implementation mode, as shown in FIGS. 1 and 2, in order to achieve more uniform inflation of the airbag ring 30, a transverse meridian 34 is provided on the airbag ring 30. The meridian 34 and the crease 31 divide the airbag ring 30 into a plurality of small airbag cavities 35 that are sequentially communicated. The small airbag cavities 35 can render the inflation more uniform. When placed on the pet's neck, it is not only very comfortable for the pet to sleep on, but also has a massage effect due to a flow of air inside the airbag, soothing the emotions of injured pets and rendering it more comfortable. The airbag ring 30 is made of nylon or PVC, which has the advantages of waterproof and dirt proof, rendering it easy to clean and scrub.

In an implementation mode, as shown in FIGS. 1 and 2, in order to facilitate the inflation and deflation of the airbag ring 30, an air nozzle 36 for inflation and deflation is further provided on the airbag ring 30. Air, aromatherapy gas, or a mixture of medicinal liquids can be injected into the airbag ring 30 through the air nozzle 36, and the air, aromatherapy gas, or mixture of medicinal liquids is injected or discharged through the nozzle 3. While adjusting the size of the airbag ring 30, if the aromatherapy gas or the mixture of medicinal liquids can be slowly released onto the pet, it can prevent the aromatherapy or medicinal liquids from being eaten by the pet, and gradually dissipate through the airbag for deodorization and treatment purposes.

The above is only for illustrating the embodiments of the present disclosure and is not intended to limit the present disclosure. For those skilled in the art, any modifications, equivalent substitutions, improvements, etc. made within the spirit and principles of the present disclosure without creative work should be included in the protection scope of the present disclosure.

What is claimed is:

1. A pet Elizabethan collar, comprising:
   a baffle composed of at least two fan-shaped blocking pieces assembled together, a first end is extended to a second end so as to form an inner small arch edge and an outer large arch edge, wherein the first end and the second end are two sides of the baffle after being composed of the fan-shaped blocking pieces; a length of the outer large arch edge is larger than a length of the inner small arch edge;
   a first flexible connector provided between the fan-shaped blocking pieces, configured to connect the blocking pieces and render them to be foldable between them;
   an airbag ring provided on the small arch edge of the baffle, wherein the airbag ring is provided with a crease corresponding to the first flexible connector that extends through the airbag ring; the airbag ring is rolled up and closed along the inner small arch edge to form a barrel with an axial cross-section of trapezoid that is capable of being placed on a pet's neck;
   a detachable connector comprising a first connection part and a second connection part, wherein the first connection part and the second connection part are respectively fixed on two opposite sides of the first end and the second end,
   wherein the first connection part and the second connection part are extended to two ends of the airbag ring that cover the airbag ring.

2. The pet Elizabethan collar according to claim 1, wherein an outer collar of the airbag ring has a same shape as the inner small arch edge of the baffle and is fixedly provided on the inner small arch edge, and
   a length of an inner collar of the airbag ring is smaller than a length of the outer collar and forms a circle that is capable of being placed around the pet's neck after being closed.

3. The pet Elizabethan collar according to claim 2, wherein an outer edge of the inner collar is further fixedly provided with an adjustment piece.

4. The pet Elizabethan collar according to claim 3, wherein the adjustment piece comprises a soft rope-passing part fixed on an outer edge of the inner collar, and an adjustable rope is provided in the soft rope-passing part;
   two ends of the adjustable rope are provided with movable buckles configured to adjust a length of a tightening part of the adjustable rope, and a closure tightness of the inner collar is adjusted by tightening or loosening the adjustable rope.

5. The pet Elizabethan collar according to claim 1, wherein the fan-shaped blocking pieces are made of hard transparent PVC material.

6. The pet Elizabethan collar according to claim 1, wherein the detachable connector is a Velcro connector, the first connection part and the second connection part are two surfaces of the Velcro.

7. The pet Elizabethan collar according to claim 1, wherein the airbag ring is provided on the inner small arch edge of the baffle through a second flexible connector, and the baffle is capable of being folded up along the second flexible connector.

8. The pet Elizabethan collar according to claim 7, wherein the second flexible connector is a zipper, and the baffle is capable of being removed from the airbag ring.

9. The pet Elizabethan collar according to claim 1, wherein a transverse meridian is provided on the airbag ring,
the meridian and the crease divide the airbag ring into a plurality of small airbag cavities that are sequentially communicated;
the airbag ring is made of nylon or PVC material.

10. The pet Elizabethan collar according to claim 1, wherein the airbag ring is further provided with an air nozzle for inflation and deflation;
the airbag ring is filled with air, aromatherapy gas or a mixture of medicinal liquids through the air nozzle.

* * * * *